United States Patent
Yi et al.

(10) Patent No.: US 8,565,837 B2
(45) Date of Patent: Oct. 22, 2013

(54) HANDS FREE CALLING SYSTEM FOR TELEMATICS USERS USING A NETWORK-BASED PRE-PAY SYSTEM

(75) Inventors: Ki Hak Yi, Windsor (CA); Sethu K. Madhavan, Erie, PA (US); Lawrence D. Cepuran, Northville, MI (US); David A. Holt, Rochester Hills, MI (US)

(73) Assignee: General Motors LLC, Detroit, MI (US)

( * ) Notice: Subject to any disclaimer, the term of this patent is extended or adjusted under 35 U.S.C. 154(b) by 176 days.

(21) Appl. No.: 12/959,092

(22) Filed: Jan. 27, 2011

(65) Prior Publication Data

US 2012/0196564 A1    Aug. 2, 2012

(51) Int. Cl.
*H04M 1/00*    (2006.01)
(52) U.S. Cl.
USPC ........ 455/569.2; 455/405; 455/406; 455/407; 455/408; 455/409; 455/411; 455/422.1; 455/432.1; 455/456.1; 455/466; 455/569.1; 370/310.2; 370/328; 370/338
(58) Field of Classification Search
USPC ........ 455/405–411, 422.1, 432.1, 456.1–457, 455/466, 569.1, 569.2; 370/310.2, 328, 338
See application file for complete search history.

(56) References Cited

U.S. PATENT DOCUMENTS

| | | | |
|---|---|---|---|
| 6,397,055 B1 * | 5/2002 | McHenry et al. | 455/408 |
| 6,487,401 B2 * | 11/2002 | Suryanarayana et al. | 455/406 |
| 6,505,161 B1 * | 1/2003 | Brems | 704/270 |
| 6,526,273 B1 * | 2/2003 | Link et al. | 455/406 |
| 6,731,925 B2 * | 5/2004 | Naboulsi | 455/345 |
| 6,748,244 B2 * | 6/2004 | Odinak | 455/569.2 |
| 6,937,850 B2 * | 8/2005 | Lippelt | 455/408 |
| 7,532,875 B1 * | 5/2009 | Parks et al. | 455/405 |
| 8,085,913 B2 * | 12/2011 | Wilkes | 379/114.2 |
| 2002/0091572 A1 * | 7/2002 | Anderson et al. | 705/16 |

* cited by examiner

*Primary Examiner* — Steve D Agosta
(74) *Attorney, Agent, or Firm* — Leydig, Voit & Mayer, Ltd.

(57) ABSTRACT

The described invention provides a method and system for allowing subscribers of a telematics service provider (TSP) to make hands-free phone calls within their vehicles through a telematics unit over a network or hardware-based pre-pay system, wherein the telematics unit or a wireless network provider associated with the TSP controls the ingoing and outgoing hands-free calling (HFC) processes. The wireless network provider, through its system at a remote call center or through the telematics unit, may determine whether the subscriber has subscribed to the TSP's HFC service, whether the subscriber has a sufficient remaining balance to initiate, receive or continue a call, and whether a user of the telematics unit is "roaming." When a user attempts to make or receive a call through the telematics unit, the wireless network provider or the telematics unit may handle the incoming or outgoing call processing, and may further provide subscriber account balance notifications to the user.

6 Claims, 4 Drawing Sheets

HANDS FREE CALLING SYSTEM FOR TELEMATICS USERS USING A NETWORK-BASED PRE-PAY SYSTEM

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

An increasing number of states within the United States, as well as an increasing number of countries around the world, have passed legislation banning the use of handheld cell phones within vehicles. The use of "Hands-free" calling, where a driver uses an accessory or speakerphone to allow them to keep both hands free during the call, is still generally legal in vehicles. However, it is further desirable, even for drivers using hands-free calling accessories with their handheld phones, to be able to avoid looking down at their phones to look for or type in numbers or receive calls.

Thus, it is an object in part to provide a system and method for efficiently allowing drivers to continue to initiate and receive phone calls within their vehicles, utilizing a telematics unit connected to the vehicle rather than their handheld phones. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for allowing subscribers of a TSP to make phone calls within their vehicles through a telematics unit over a network-based pre-pay system. In one implementation, subscribers of the TSP may choose to subscribe to a hands-free calling (HFC) service utilizing the telematics unit of the subscribers' vehicle capability to make calls over a wireless network, and the subscriber pays the TSP or the wireless network provider some amount of money in exchange for a corresponding amount of minutes. When the user of the telematics unit attempts to initiate an outgoing call or receive an incoming call through the telematics unit, the wireless network provider or the telematics unit controls the outgoing or incoming HFC process. The wireless network provider or the telematics unit may perform processes such as determining whether the subscriber is "roaming," determining the balance of the subscriber's remaining minutes, notifying the subscriber of an incoming call, allowing an outgoing call to proceed, monitoring an ongoing call, or terminating a call.

In a further implementation, the telematics unit may request a balance inquiry and display the result to the user at the beginning of a call, the end of a call, or whenever the user requests.

In another further implementation, a feature associated with incoming calls may be enabled which allows the telematics unit to connect the call and may further allow the telematics unit to maintain the call connection without checking the subscriber's account balance or decrementing the subscriber's account.

In yet another further implementation, the HFC process is conducted over a 2G GSM or 3G WCDMA network, and the telematics unit utilizes "Unstructured Supplementary Service Data" (USSD) protocol to conduct balance inquiries.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for allowing subscribers of a TSP to make hands-free phone calls within their vehicles through a telematics unit over a network-based pre-pay system, wherein the wireless network provider or the telematics unit controls the ingoing and outgoing HFC processes. The wireless network service provider and the telematics unit may determine whether the subscriber has subscribed to the TSP's HFC service, whether the subscriber has a sufficient remaining balance to initiate, receive or continue a call, and whether a user of the telematics unit is "roaming." When a user attempts to make or receive a call through the telematics unit, the wireless network provider and the telematics unit handle the incoming or outgoing call processing, and may further provide subscriber account balance notifications to the user.

Figure 1:
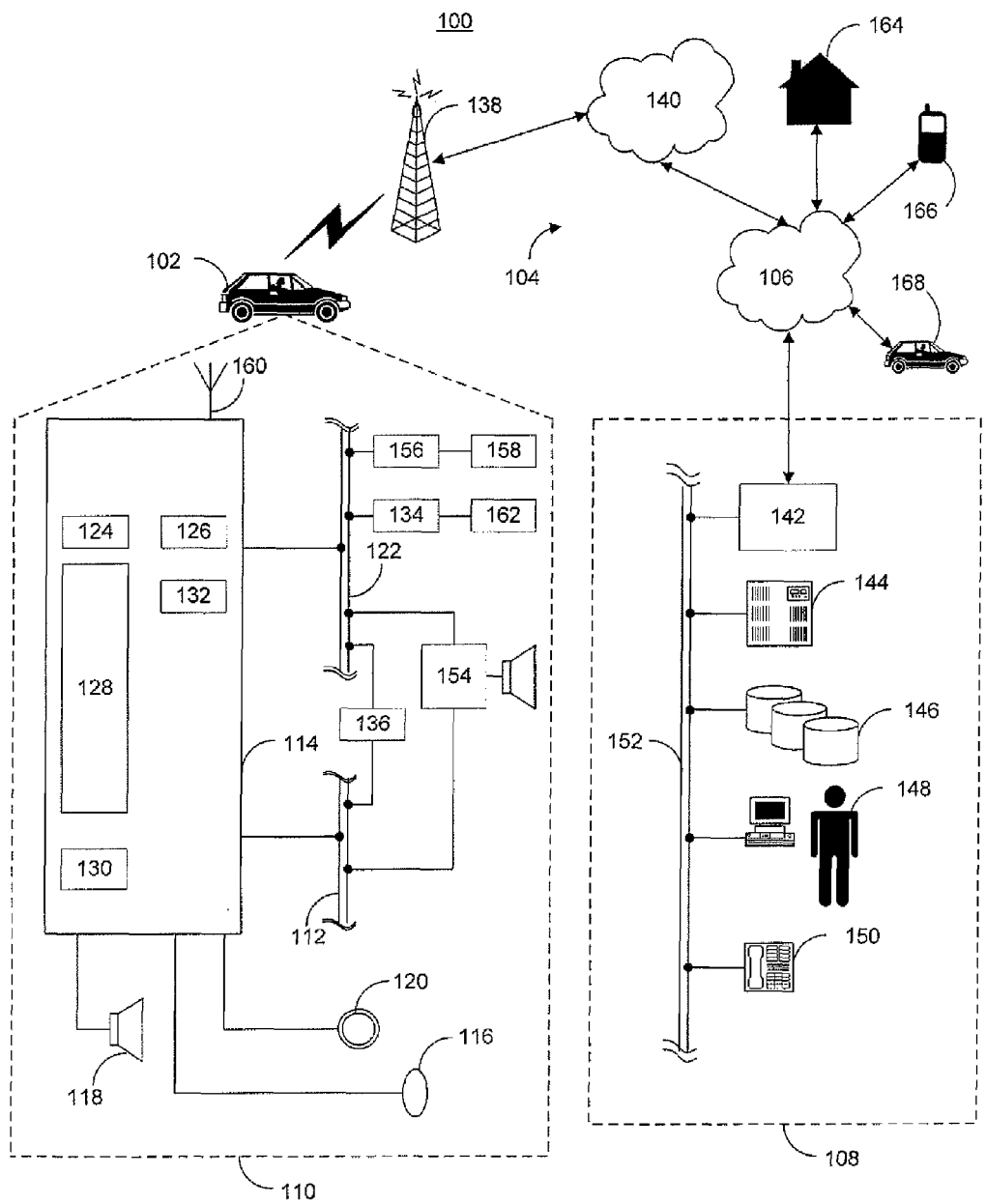
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. The wireless carrier network 104 may be maintained by a wireless network provider, and network provider's system may include servers, processors, and other components used in the operation of the wireless carrier network as is appreciated by those skilled in the art. Land network 106 can include, for example, a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof. Landlines 164, mobile phones 166, and other telematics units 168 may also be connected to land network 106. For simplicity, landlines 164, mobile phones 166 and other telematics units 168 are depicted as connected to the same land network 106 as the call center 108, but one of ordinary skill in the art will appreciate that they may be connected to other land networks through other cell towers 138 or MSCs 140.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information such as the account balance of a subscriber's account. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As noted above, the telematics unit 114 and associated components are associated in an implementation of the invention with a vehicle 102. With further reference to the architecture of FIG. 1, and turning more specifically to FIG. 2, an implementation of the outgoing HFC process 200 by a telematics unit is depicted. Initially, when a subscriber to a TSP wishes to utilize the TSP's HFC services, the TSP or wireless network over which the HFC calling is conducted may require the subscriber to make a payment of money into a HFC pre-pay account or some other account. The subscriber may add funds to the HFC pre-pay account whenever the subscriber wishes to do so. It will be appreciated by one of ordinary skill in the art that TSPs and wireless network providers are capable of setting up such an account and receiving payments from subscribers.

To begin the outgoing HFC process, a user of a telematics unit 114 may attempt to make an outgoing call 201 through the telematics unit 114. It will be appreciated by one skilled in the art that placing a call may be accomplished through the telematics unit via multiple methods, including by typing in or selecting a name or number or other identifier associated with a phone number through buttons and/or controls 120, or by speaking a name or number or other identifier associated with a phone number into a microphone 118. It will further be appreciated that the telematics unit 114 may be associated with a unique phone number.

The wireless network provider may determine whether the user is "roaming," e.g., whether the subscriber, through the telematics unit, is connected to the subscriber's home network or a visited network and whether the subscriber's prepaid HFC account should be billed at a predetermined "roaming" rate. It will be appreciated that, alternatively, the processing or circuitry required to determine whether the subscriber is "roaming" may be implemented on the telematics unit 114 rather than at the call center 108. The criteria for determining whether a user is "roaming" and the predetermined "roaming" rate may be determined and managed by rate plan agreements between the TSP and wireless network providers. In a further implementation, there may be visited networks that are "forbidden" by the TSP (for example, a wireless network provider may prohibit the TSP's telematics units from conducting calls over the forbidden visited network). In this implementation, if the telematics unit 114 or home network provider determines that the visited network is "forbidden," the telematics unit 114 may not attempt to connect the call over that visited network, and may further search for other available networks.

Figure 2:
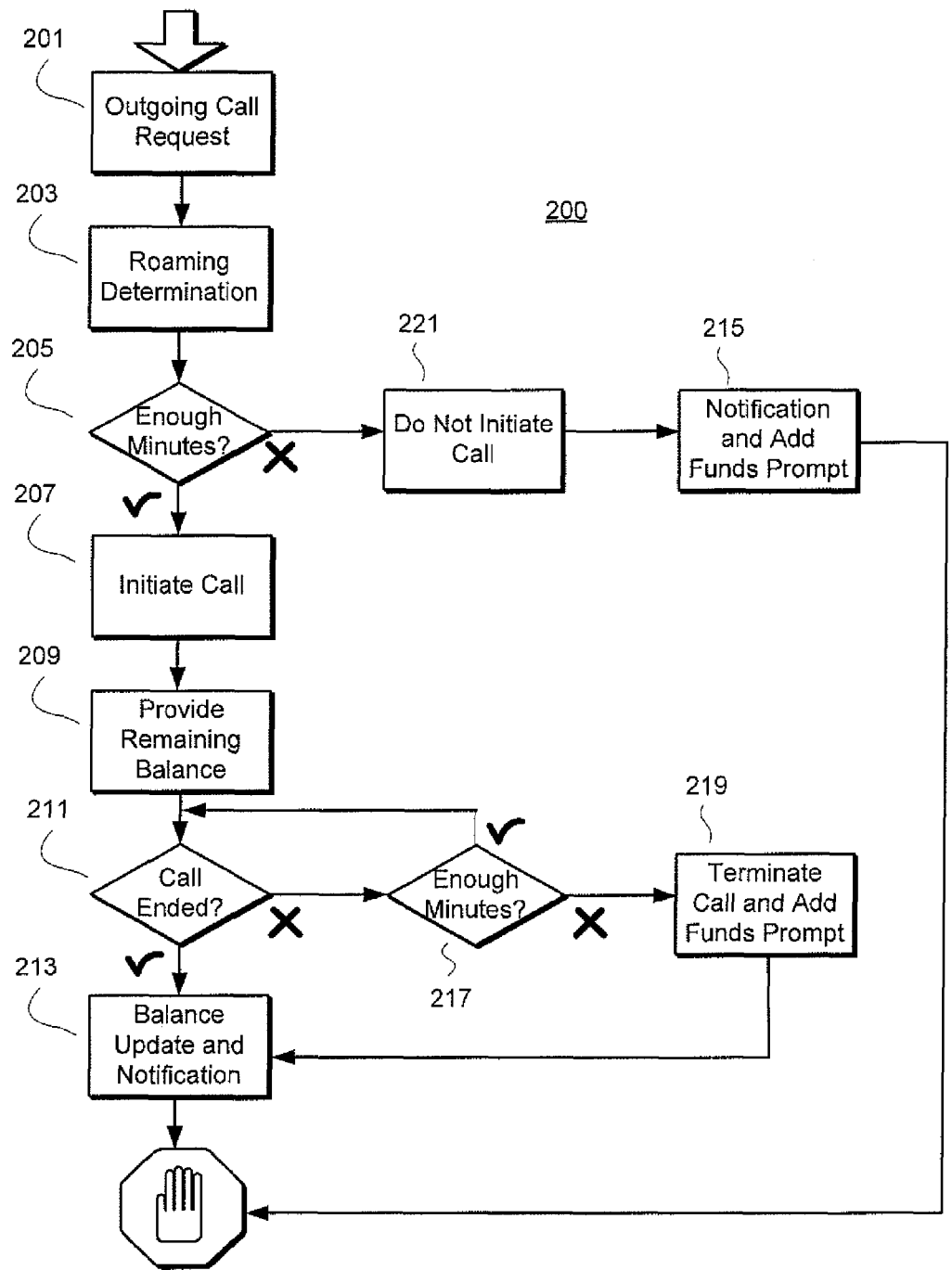
FIG. 2 is a flowchart illustrating a process for handling an outgoing hands-free call in one implementation.

In a further implementation, the call center 108 or the telematics unit 114 may also determine whether the telematics unit 114 has the HFC enabled. This determination may occur before or after the roaming determination. If HFC is not enabled, the call may not be connected, and the user of the telematics unit may be notified that the feature is not enabled. If HFC is enabled, the call may continue to be processed as shown in FIG. 2.

After determining if the user is "roaming" 203 and, if applicable, the associated "roaming" rate, the wireless network provider or the telematics unit 114 may determine whether the subscriber's account has a sufficient pre-paid balance to handle the outgoing call 205 by comparing the account balance to a predetermined minimum threshold amount, which may correspond to whether the user is "roaming" or not and an associated "roaming" call decrement rate, if applicable. The call decrement rate may also depend on other factors, in addition to whether the user is roaming or not, including but not limited to the location of the user, the type of plan, and the currency used to fund the account. This pre-paid balance and minimum threshold may be measured in units of time (e.g. minutes) or in units of currency (e.g. dollars). In a further implementation, the predetermined minimum threshold amount may be a call decrement rate, according to which funds are decremented from a subscriber's account balance per unit of time. In an alternative implementation, the predetermined minimum threshold may be set to zero. In yet another further implementation, the telematics unit 114 may notify the user of the telematics unit when the user is determined to be "roaming," and, in yet another further implementation, may further prompt the user for permission to connect the call as a "roaming" call using the "roaming" rate.

In one implementation, the telematics unit 114 may store the subscriber's account balance on the telematics unit 114, and if the balance is equal to zero or otherwise insufficient to initiate the call, the telematics unit 114 may send a balance inquiry to the wireless network provider. The wireless network provider may respond by providing the telematics unit 114 with an updated balance for the subscriber's account, which may replace the previous balance stored on the telematics unit 114. It will be appreciated by one skilled in the art that the subscriber's account balance may be stored by the wireless network provider or by the TSP at the call center 108, or both, and if the decrementing associated with a call is performed by the telematics unit 114, the telematics unit 114 may send the balance inquiry request to the wireless network provider or to the call center 108, or both, depending on the implementation.

If the telematics unit 114 determines that the updated balance of the subscriber's account is insufficient to handle the cost of the call, the telematics unit 114 may decline to connect the call 221. In a further implementation, the telematics unit 114 may further notify the user of this result and may further prompt the user to add funds to the subscriber's account 215.

If the telematics unit 114 determines that the subscriber's account does have a sufficient pre-paid balance to handle the call 205, the telematics unit 114 may initiate the call connection 207. In a further implementation, the telematics unit 114 may also communicate (via speakers or a display interface or some other method) the remaining balance on the subscriber's pre-paid account to the user. The remaining balance may further be communicated in such a way as to inform the user of how much time the user may spend on the call (e.g. in the form of how many minutes are remaining).

In an alternative implementation, the wireless network provider may handle the balance checking of the subscriber's account and may inform the telematics unit 114 whether the subscriber's account has a sufficient pre-paid balance to handle the call 205 and may further command the telematics unit 114 to prompt the user to add funds if necessary.

While the user is on the call (i.e. the call has not ended yet 211), funds or minutes may be deducted from the subscriber's pre-pay account while the call is ongoing at regular intervals (e.g. every minute), and the wireless network provider or the telematics unit 114 may monitor whether enough minutes remain in the subscriber's pre-pay account to maintain the call 217 (whether the remaining balance is greater than the pre-determined minimum threshold).

If the subscriber's pre-pay account runs out of minutes or funds while the user is on the call, the telematics unit may terminate the call 219 based on a notification from the wireless network provider that the account balance is insufficient to continue the call or, alternatively, based on the telematics unit's own determination that the account balance is insufficient to continue the call. The telematics unit 114 may further notify the user that the call was terminated due to an insufficient account balance remaining in the subscriber's account, and may further prompt the user to add funds to the subscriber's account 219.

If the subscriber's account still has sufficient remaining balance to maintain the call but the user of the telematics unit or the other party to the phone call requests termination of the call (e.g. by hanging up), the telematics unit 114 may terminate the call 211. Alternatively, the call may also be terminated if the network drops the call.

In a further implementation, after the call has been terminated, the telematics unit 114 may send a balance inquiry to the wireless network provider and, after receiving a response, communicate the remaining balance on the subscriber's account to the user 213. In further implementations, the telematics unit 114 or wireless network provider may also transmit an update of the subscriber's account balance to the call center 108. It will be appreciated by one skilled in the art that the subscriber's account balance may be stored by the wireless network provider or by the TSP at the call center 108, or both, and if the decrementing associated with a call is performed by the telematics unit 114, the telematics unit 114 may transmit an update to the subscriber's account balance to the wireless network provider or to the call center 108, or both, depending on the implementation.

In a further implementation, the telematics unit 114 may detect an attempted incoming call rather than receiving a request to initiate an outgoing call 201. One of ordinary skill in the art will appreciate that the process 200 can be applied to an incoming call in a similar manner as described above. In a further implementation, for an incoming call, the telematics unit 114 may have a feature enabled which allows the telematics unit 114 to initiate an incoming call without checking the balance of the subscriber's account. In this implementation, the telematics unit 114 may check if the feature is enabled or not, and if it is, may connect the incoming call. If the feature is not enabled, it may perform the same process as with the outgoing call of checking the previous balance stored on the telematics unit 114, sending a balance inquiry if the previously stored balance is zero or otherwise insufficient, and prompting the user to add funds if the updated balance is also zero or otherwise insufficient. In a further implementation, once the call is connected, call processing similar to that which is performed during an outgoing call may be performed for the incoming call, including the balance checking and the determination of whether the call has ended through a user or another party terminating the call (e.g. hanging up) or the call being dropped. In yet another further implementation, if the feature is enabled and the call is connected, the telematics unit 114 and the wireless network provider may not decrement the subscriber's account and thus balance checking, updating, or notification may not be performed for an incoming call with the feature enabled.

In yet another further implementation, balance checking functions may be implemented by a balance checking server at the TSP call center 108 instead of at the wireless network provider. It will be appreciated by one skilled in the art that the processes described herein may be readily modified to incorporate balance checking at the TSP call center 108 rather than at the wireless network provider.

Figure 3:
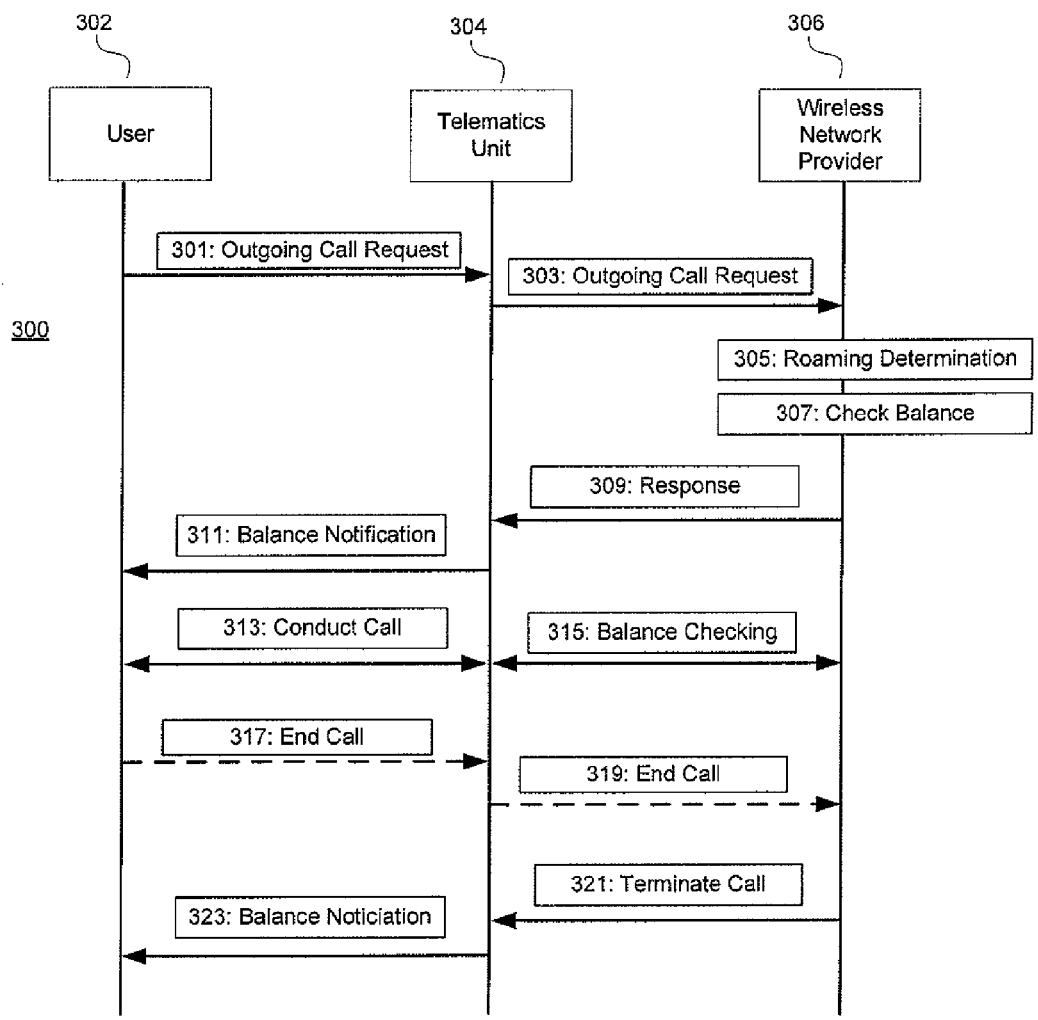
FIG. 3 is a flowchart illustrating the role of a subscriber, a telematics unit, and a wireless network provider in a process for handling an outgoing hands-free call in one implementation.

Turning now to FIG. 3, with further reference to the architecture of FIG. 1, the outgoing HFC process is shown in one exemplary implementation illustrating the role of the user 302, telematics unit 304 (114), and the wireless network provider 306 (108). First, the user may send an outgoing call request 301 to the telematics unit 304 by speaking a name or number or other identifier associated with a phone number, or by selecting or typing in a name or number or other identifier associated with a phone number on a user interface of the telematics unit 304. The telematics unit may then forward the call request 303 to the wireless network provider 306, and the wireless network provider determines whether the user is roaming 305 and the remaining account balance of the subscriber account associated with that telematics unit 307. This determination may be based on data sent in the outgoing call request 303.

After making the determinations 305 and 307, the TSP call center 306 may send a response 309 to the telematics unit 304, indicating whether the call may be connected or whether the subscriber's account lacks a sufficient balance. The telematics unit 304 may then communicate to the user 302 the remaining account balance or notify the user that the call could not be connected due to insufficient account balance 311. The telematics unit 304 may also prompt the user 302 to add funds to the subscriber's account if the subscriber's account lacks sufficient balance.

If the subscriber's account contains a sufficient balance, the call may be connected and the user 302 may conduct the call 313 through the telematics unit 304. While the call is being conducted, the wireless network provider may decrement funds or minutes from the subscriber's account balance. The wireless network provider may also monitor whether the subscriber has sufficient account balance to maintain the call 315.

If the subscriber's account runs out of funds or minutes while the user is on the call, the wireless network provider 306 may order the telematics unit 304 to terminate the call 321 and the telematics unit 304 may further prompt the user to add additional funds. The call may also be terminated by the user 302 sending an end call command 317 to the telematics unit 304 (e.g. by hanging up), by the other party to the call ending the call, or by the call being dropped by the network. The telematics unit may relay to the wireless network provider 306 when the user or the other party to the call has terminated the call 319, and the wireless network provider may then stop deducting minutes and, in some implementations, may order the telematics unit to terminate the call. In an alternative implementation, the wireless network provider may itself monitor the status of the call and whether it has been terminated by a party to the call or dropped by the network. In a further implementation, the telematics unit 304 may communicate the remaining balance on the subscriber's pre-pay account to the user after the call has concluded 323, and the telematics unit 304 or wireless network provider 306 may further transmit an update of the subscriber's account balance to the TSP call center 108.

It will be appreciated by one skilled in the art that the process shown in FIG. 3 may also be adapted to the incoming HFC process in another implementation with minor changes. For example, instead of the user 302 sending an outgoing call request 301 to the telematics unit 304 and the telematics unit 304 passing that request along 303 to the wireless network provider 306, the telematics unit 304 may receive an incoming call request from an outside caller and pass that connection request along to the wireless network provider 306. Additionally, a feature may be enabled for incoming calls whereby no decrementing of the subscriber's account occurs, and thus balance checking, updating, or notifications may not be performed.

Figure 4:
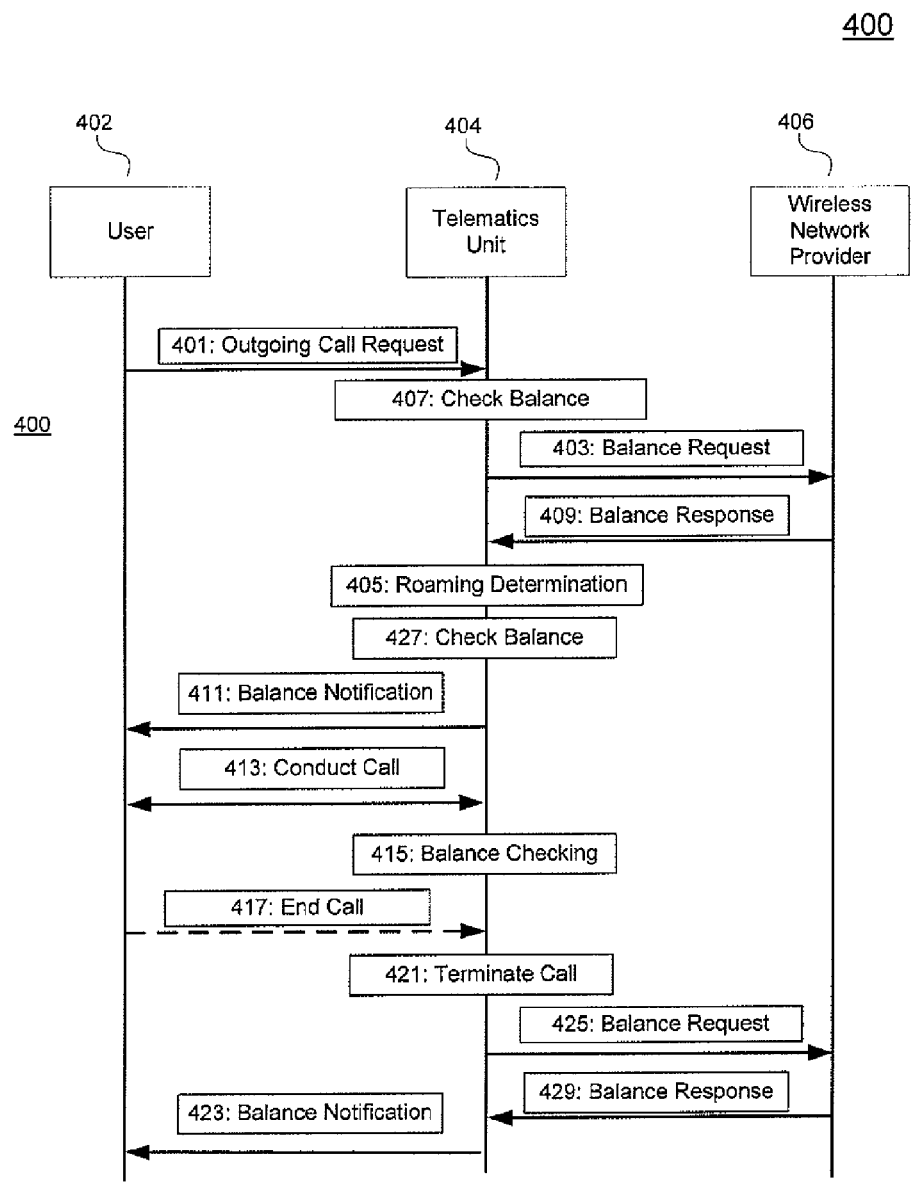
FIG. 4 is a flowchart illustrating the role of a subscriber, a telematics unit, and a wireless network provider in a process for handling an outgoing hands-free call in a different implementation from that of FIG. 3.

Turning now to FIG. 4, with further reference to the architecture of FIG. 1, the outgoing HFC process is shown in a different exemplary implementation from that of FIG. 3 illustrating the role of the user 402, telematics unit 404 (114), and the TSP call center 406 (108), where the telematics unit 404 handles more of the HFC process. First, the user 402 may send an outgoing call request 401 to the telematics unit 404. If the balance of the subscriber's account previously stored on the telematics unit is zero 407, the telematics unit may send an account balance request 403 to the TSP call center 406, which may provide a response 409 including the subscriber's remaining pre-pay HFC account balance. The telematics unit 404 may determine whether the user 402 is "roaming" 405 and whether the subscriber's remaining pre-pay account balance is sufficient to initiate the call by comparing the remaining account balance to a predetermined threshold amount set by the TSP 427. The telematics unit 404 may further communicate the remaining balance to the user 402 or notify the user 402 that the subscriber's account lacks sufficient balance to connect the call 411.

If the subscriber's remaining pre-pay account balance is sufficient, the telematics unit 404 may connect the call and allow the user to conduct the call 413 over the telematics unit 404. While the call is connected, the telematics unit 404 may monitor whether the subscriber's account balance has sufficient funds to maintain the call 415 by deducting funds or minutes from the balance amount previously received 409 from the TSP call center 406 according to a call decrement rate based on whether the user is roaming or not. If the telematics unit 404 determines that the subscriber's account lacks sufficient funds and the call is still being conducted, the telematics unit 404 may terminate the call 421 and may further prompt the user to add more funds. The telematics unit 404 may also terminate the call when requested by the user 402 or by the other party to the call (e.g. when the user or the other party hangs up) 417. Alternatively, the call may also be terminated if the network drops the call. At the conclusion of the call, the telematics unit 404 may send a balance inquiry 425 to the wireless network provider 406 to update the subscriber's account balance stored on the telematics unit 429. In a further implementation, the wireless network provider 406 or the telematics unit 404 may further send a balance update to the TSP call center 108. The telematics unit 404 may further communicate 423 to the user 402 the remaining balance of the subscriber's pre-pay account after the call has concluded and the telematics unit 404 has received a response to the balance inquiry.

It will be appreciated by one skilled in the art that the process shown in FIG. 4 may also be adapted to the incoming HFC process in another implementation with minor changes. For example, instead of the user 402 sending an outgoing call request 401 to the telematics unit 404, the telematics unit 404 may receive an incoming call request. Additionally, a feature may be enabled for incoming calls whereby no decrementing of the subscriber's account occurs, and thus balance checking, updating, or notifications may not be performed.

In a further implementation, the user of the telematics unit 114 may request the account balance of the subscriber's account at any time, and the telematics unit 114 may send an account balance request to the call center 108 or the wireless network provider (depending on where the subscriber's account information is stored), receive a response containing the account balance, and communicate it to the user. If the telematics unit 114 does not have HFC enabled, the telematics unit 114 may notify the user that HFC is not enabled.

In yet another further implementation, wireless carrier system 104 is a cellular system utilizing a 2G GSM or 3G WCDMA network. In yet another further implementation, the telematics unit 114 may use Unstructured Supplementary Service Data (USSD) protocol to communicate with the TSP and the wireless network provider's computers, particularly when conducting balance inquiries.

It will be appreciated that the described system allows subscribers of a TSP to make hands-free phone calls within their vehicles through a telematics unit over a network-based pre-pay system, wherein the TSP and wireless network provider control the ingoing and outgoing hands-free calling (HFC) processes. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for providing pre-pay hands-free calling (HFC) services to a subscriber of a telematics service provider (TSP) through a telematics unit over a network, the method comprising:
   receiving, at a service provider, from the telematics unit over the network, at least one of an outgoing call request and an incoming, call request;
   determining, at the service provider, whether the user of the telematics unit is connected to one of a home network and a visited network;
   determining, at the service provider, an account balance of the subscriber's account;
   sending, to the telematics unit over the network, authorization to connect a call between a user of the telematics unit and another party, if the account balance of the subscriber's account is greater than a predetermined threshold amount;
   monitoring, at the service provider while the call is connected, whether the account balance of the subscriber's account is sufficient to continue to the call; and
   sending, to the telematics unit over the network, a command to terminate the call if a condition from a group of conditions is satisfied, the group consisting of: the service provider receives an end call request from the telematics unit indicating at least one of the user and the another party has requested the call be terminated, at least one of the user and the another party disconnects from the call, and the account balance of the subscriber's account is insufficient to continue the call;
   wherein the account balance of the subscriber's account and the predetermined threshold amount are measured in at least one of units of time and units of currency;
   wherein the predetermined threshold amount is based on whether the user of the telematics unit is connected to one of a home network and a visited network; and
   wherein the monitoring comprises:
      deducting, at the service provider, at regular intervals while the call is connected, a predetermined amount from the account balance of the subscriber's account to update the account balance of the subscriber's account, wherein the predetermined amount corresponds to the length of the interval, and
      comparing the account balance of the subscriber's account after the deduction to the predetermined threshold amount.

2. The method of claim 1, wherein the network is at least one of a 2G GSM network and a 3G WCDMA network.

3. A method for providing pre-pay hands-free calling (HFC) services to a subscriber of a telematics service provider (TSP) through a telematics unit over a network, the method comprising:
   receiving, at a service provider, from the telematics unit over the network, at least one of an outgoing call request and an incoming call request;
   determining, at the service provider, whether the user of the telematics unit is connected to one of a home network and a visited network;
   determining, at the service provider, an account balance of the subscriber's account;
   sending, to the telematics unit over the network, authorization to connect a call between a user of the telematics unit and another party, if the account balance of the subscriber's account is greater than a predetermined threshold amount;
   sending, to the telematics unit, information regarding the subscriber's remaining account balance, wherein the telematics unit further communicates the information to the user, in at least one of the group of situations consisting of:
      after determining whether the account balance is greater than or equal to a predetermined threshold;
      when the call connection is terminated; and
      upon request by the user through the telematics;
   monitoring, at the service provider while the call is connected, whether the account balance of the subscriber's account is sufficient to continue to the call; and
   sending, to the telematics unit over the network, a command to terminate the call if at least one of the following conditions is satisfied:
      the service provider receives an end call request from the telematics unit indicating at least one of the user and the another party has requested the call be terminated,
      at least one of the user and the another party disconnects from the call, and
      the account balance of the subscriber's account is insufficient to continue to the call;
   wherein the account balance of the subscriber's account and the predetermined threshold amount are measured in at least one of units of time and units of currency; and
   wherein the predetermined threshold amount is based on whether the user of the telematics unit is connected to one of a home network and a visited network.

4. The method of claim 3, wherein the network is at least one of a 2G GSM network and a 3G WCDMA network.

5. A system for providing pre-pay hands-free calling (HFC) services to a subscriber of a telematics service provider (TSP) through a telematics unit over a network, the system comprising:
   a vehicle equipped with a telematics unit, wherein the telematics unit is adapted to send and receive data to and from a service provider and connect calls between a user of the telematics unit and another party over a network; and
   a service provider adapted to send and receive data to and from the telematics unit and to store and access information regarding a subscriber's account the service provider being configured to include a non-transitory computer-readable medium including computer-executable instructions for carrying out the steps of a method comprising:
      receiving, at a service provider, from the telematics unit over the network, at least one of an outgoing call request and an incoming call request;

determining, at the service provider, an account balance of the subscriber's account;

determining, at the service provider, whether the user of the telematics unit is connected to one of a home network and a visited network;

sending, to the telematics unit over the network, authorization to connect a call between a user of the telematics unit and another party, if the account balance of the subscriber's account is greater than a predetermined threshold amount;

monitoring, at the service provider while the call is connected, whether the account balance of the subscriber's account is sufficient to continue to the call; and sending, to the telematics unit over the network, a command to terminate the call if a condition from a group of conditions is satisfied, the group consisting of: the service provider receives an end call request from the telematics unit indicating at least one of the user and the another party has requested the call be terminated, at least one of the user and the another party disconnects from the call, and the account balance of the subscriber's account is insufficient to continue the call;

wherein the account balance of the subscriber's account and the predetermined threshold amount are measured in at least one of units of time and units of currency;

wherein the predetermined threshold amount is based on whether the user of the telematics unit is connected to one of a home network and a visited network, and wherein the monitoring comprises:

deducting, at the service provider, at regular intervals while the call is connected, a predetermined amount from the account balance of the subscriber's account to update the account balance of the subscriber's account, wherein the predetermined amount corresponds to the length of the interval, and comparing the account balance of the subscriber's account after the deduction to the predetermined threshold amount.

6. The system of claim 5, wherein the network is at least one of a 2G GSM network and a 3G WCDMA network.

* * * * *